(12) United States Patent
Buia et al.

(10) Patent No.: US 7,980,076 B2
(45) Date of Patent: Jul. 19, 2011

(54) CONTROLLED CONDENSATE COLLECTION AND EVACUATION FOR CHARGE AIR COOLER

(75) Inventors: Christian John-Augustin Buia, Troy, MI (US); Darren Lee Bohne, Fraser, MI (US); Ryan A. Kuhlenbeck, Ferndale, MI (US); Paul S. Czarnowczan, Macomb Township, MI (US); Thomas Porter Rutherford, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 12/241,174

(22) Filed: Sep. 30, 2008

(65) Prior Publication Data
US 2010/0077995 A1    Apr. 1, 2010

(51) Int. Cl.
*F02B 29/04* (2006.01)
(52) U.S. Cl. .......................................... 60/599; 123/563
(58) Field of Classification Search ............ 60/598–612; 123/559–565
See application file for complete search history.

(56) References Cited

U.S. PATENT DOCUMENTS

| | | | | |
|---|---|---|---|---|
| 4,563,983 A * | 1/1986 | Hayashi et al. | ............ | 123/41.21 |
| 6,301,887 B1 * | 10/2001 | Gorel et al. | ................... | 60/605.2 |
| 6,367,256 B1 * | 4/2002 | McKee | ........................ | 60/605.2 |
| 6,527,821 B2 * | 3/2003 | Liu et al. | ...................... | 55/385.3 |
| 6,598,396 B2 * | 7/2003 | Bailey | .......................... | 60/605.2 |
| 6,978,772 B1 * | 12/2005 | Dorn et al. | ............... | 123/568.12 |
| 7,669,417 B2 * | 3/2010 | Smith | ............................. | 60/599 |
| 2010/0229549 A1 * | 9/2010 | Taylor | ............................ | 60/599 |

FOREIGN PATENT DOCUMENTS

| | | |
|---|---|---|
| DE | 2814593 A1 | 10/1979 |
| DE | 19714308 A1 | 10/1998 |
| DE | 10238839 A1 | 3/2004 |

* cited by examiner

*Primary Examiner* — Thomas Denion
*Assistant Examiner* — Douglas J. Duff
(74) *Attorney, Agent, or Firm* — Quinn Law Group, PLLC

(57) ABSTRACT

A condensate extractor assembly is provided for collecting and evacuating condensate from inside a charge air cooler in an internal combustion engine assembly. The condensate extractor assembly includes a sump that is attached to or formed in the charge air cooler. The sump is adapted to drain and collect condensate from the charge air cooler. A hose is fluidly coupled at one end to the sump, and fluidly coupled at a second end to the intake manifold. The hose is configured to evacuate condensate from the sump and distribute it directly to the intake manifold in response to the pressure gradient generated by the engine assembly when in an on-state. The hose defines an orifice that restricts the flow of air and condensate through the hose. A filter is fluidly coupled to the hose, fluidly intermediate the orifice and the sump member.

18 Claims, 3 Drawing Sheets

100 US 7,980,076 B2

CONTROLLED CONDENSATE COLLECTION AND EVACUATION FOR CHARGE AIR COOLER

TECHNICAL FIELD

The present invention relates generally to internal combustion engines, and more specifically to internal combustion engine assemblies equipped with a supercharging device and a charge air cooler.

BACKGROUND OF THE INVENTION

Internal combustion engines (ICE) are often called upon to generate considerable levels of power for prolonged periods of time on a dependable basis. Many ICE assemblies employ a mechanical supercharging device, such as a turbocharger (which is short for "turbine boosted, forced-induction supercharger"), to compress the incoming airflow before it enters the intake manifold of the engine in order to increase power and efficiency. Specifically, a turbocharger is a gas compressor that forces more air and, thus, more oxygen into the combustion chambers of the ICE than is otherwise achievable with ambient atmospheric pressure (e.g., naturally-aspirated engines). The additional mass of oxygen-containing air that is forced into the ICE improves the engine's volumetric efficiency, allowing it to burn more fuel in a given cycle, and thereby produce more power.

Under extreme operating conditions, the "supercharging" process may elevate the temperature of the intake air to an extent that causes formation of undesired exhaust by-products, such as various nitrogen oxides (NOx), and reduces the density of the air charge. To combat this problem, original equipment manufacturers have historically employed a device most commonly known as an intercooler, but more appropriately identified as a charge air cooler (CAC) or aftercooler, to extract heat from the air exiting the supercharging device. A CAC is a heat exchange device used to cool the air charge and, thus, further improve volumetric efficiency of the ICE by increasing intake air charge density through isochoric cooling. A decrease in air intake temperature provides a denser intake charge to the engine and allows more air and fuel to be combusted per engine cycle, increasing the output of the engine.

The heat exchange process can cause moisture to condense and, thus, form inside of the CAC system, especially when conducted in conditions where the ambient air flowing through the supercharging device and CAC is substantially humid (e.g., greater than 50% relative humidity). The condensation tends to accumulate downstream from the CAC, within the conduit through which the intake manifold receives the supercharged airflow. The liquefied condensation can be drawn into the intake manifold, entering the various cylinder combustion chambers. Depending upon the configuration of the CAC and supercharging devices, as well as their individual and relative packaging, the condensation may begin to puddle and enter the combustion chambers in large amounts. The unintended introduction of condensate buildup to the engine cylinders can potentially cause the ICE to misfire, leading to premature engine wear, and creating a false-positive error signal triggering a service engine indicator light. In addition, accumulated water condensate that is not properly evacuated from the CAC can freeze and crack the CAC when ambient temperatures reach below freezing.

SUMMARY OF THE INVENTION

According to one embodiment of the present invention, a condensate extractor assembly for collecting and evacuating condensate from a charge air cooler in an internal combustion engine (ICE) assembly is provided. The ICE assembly includes an air intake system in fluid communication with the charge air cooler. The air intake system includes an intake manifold in fluid communication with a throttle body.

The condensate extractor assembly includes a sump member that is configured to integrate with (i.e., form in or attach to) the charge air cooler. The sump member is adapted to collect condensate from the charge air cooler. A hose member has a first end in fluid communication with the sump member, and a second end configured to fluidly communicate with the ICE intake manifold. The hose member is configured to evacuate condensate from the sump member and distribute it to the intake manifold.

The hose member has an orifice that is configured to restrict the flow of air and condensate through the hose member. This restriction prevents undesirable amounts of condensate and air from bypassing the throttle body and entering the intake manifold, thus ensuring good engine speed control. In addition, a filter member may be placed in fluid communication with the hose member, fluidly upstream from the orifice. The filter member helps prevent plugging of the orifice, and minimizes or eliminates the inadvertent introduction of contaminates to the intake manifold.

The sump member includes a sump base with a sump volume that is configured to accumulate condensate therein. A line extension protrudes from the sump base. The line extension is configured to fluidly couple the sump volume to the first end of the hose member. The sump volume is vertically lower than the charge air cooler when the sump member and charge air cooler are operatively attached to the ICE assembly.

In one particular instance, the sump member also includes a sump cap that is operatively attached to the sump base. The sump cap defines one or more fluid apertures therethrough. Each fluid aperture is configured to fluidly communicate the sump volume with the charge air cooler. Ideally, the sump cap also defines a fastener hole therethrough. The fastener hole is configured to receive and mate with a fastener, such as a bolt, to thereby attach the sump member to the charge air cooler.

The charge air cooler includes a first end tank in upstream fluid communication with a second end tank. In one instance, the sump member is adapted to fluidly couple to the bottom of the second end tank. Alternatively, the sump member and second end tank are preformed as a single-piece, unitary structure.

The ICE assembly creates a pressure gradient when in an on-state. The hose member removes condensate from the charge air cooler in a continuous manner in response to the pressure gradient, spreading out water ingestion by the intake manifold, thereby preventing engine misfire.

The hose member is characterized by a lack of fluid communication with a container that is configured to collect and store condensate. As such, slosh and road camber phenomena associated with the use of condensate containers is eliminated. In a similar regard, the hose member is characterized by a lack of a direct fluid communication with the throttle body.

In accordance with another embodiment of the present invention, an internal combustion engine assembly is provided. The engine assembly includes an air intake system with an intake manifold that is in downstream fluid communication with (i.e., fluidly downstream from) a throttle body. A supercharging device is in upstream fluid communication with (i.e., fluidly upstream from) the air intake system, and configured to provide compressed airflow thereto. A charge air cooler is placed in fluid communication with the air intake system, between the supercharging device and the throttle body. The charge air cooler is configured to extract heat from the compressed airflow exiting the supercharging device. A sump member is in direct fluid communication with the charge air cooler. The sump member is configured to drain and collect condensate from inside the charge air cooler. A hose member is fluidly coupled to the sump member at a first end, and fluidly coupled to the intake manifold at a second end. The hose member continuously evacuates condensate from the sump member and distributes it directly to the intake manifold in response to the pressure gradient generated by the ICE assembly when in an on-state.

The charge air cooler is operatively attached to the internal combustion engine. Once the charge air cooler is properly attached, the sump member is fluidly coupled to the vertically lowest most portion of the charge air cooler. In doing so, pooling or puddling of water condensation within the charge air cooler is minimized or eliminated.

According to yet another embodiment of the present invention, an internal combustion engine assembly is provided. The ICE assembly includes an air intake system that is in fluid communication with the engine block, and operable to regulate the distribution of air charges thereto. The air intake system includes an intake manifold in downstream fluid communication with a throttle body. The internal combustion engine assembly also includes an exhaust manifold that is in fluid communication with the engine block to receive and expel exhaust gases therefrom.

The present embodiment also includes a turbocharger device in downstream fluid communication with the exhaust manifold. The turbocharger device is configured to redirect exhaust flow from the exhaust manifold to thereby compress air. The turbocharger device is in upstream fluid communication with the air intake system, and configured to distribute the compressed airflow thereto. The ICE assembly also includes a charge air cooler in downstream fluid communication with the turbocharger device, and in upstream fluid communication with the air intake system. The charge air cooler is configured to extract heat from the compressed airflow exiting the turbocharger device, prior to the compressed airflow entering the air intake system.

A sump member is fluidly coupled directly to the charge air cooler. The sump member is configured to drain and collect condensate from inside the charge air cooler. A hose member is fluidly coupled to the sump member at one end, and fluidly coupled to the intake manifold at a second end. The hose member continuously evacuates condensate from the sump member, and distributes it directly to the intake manifold in response to the pressure gradient generated by the ICE assembly. The hose member includes an orifice that is configured to restrict the flow of air and condensate through the hose member. A filter member is fluidly coupled to the hose member, between the orifice and the sump member.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
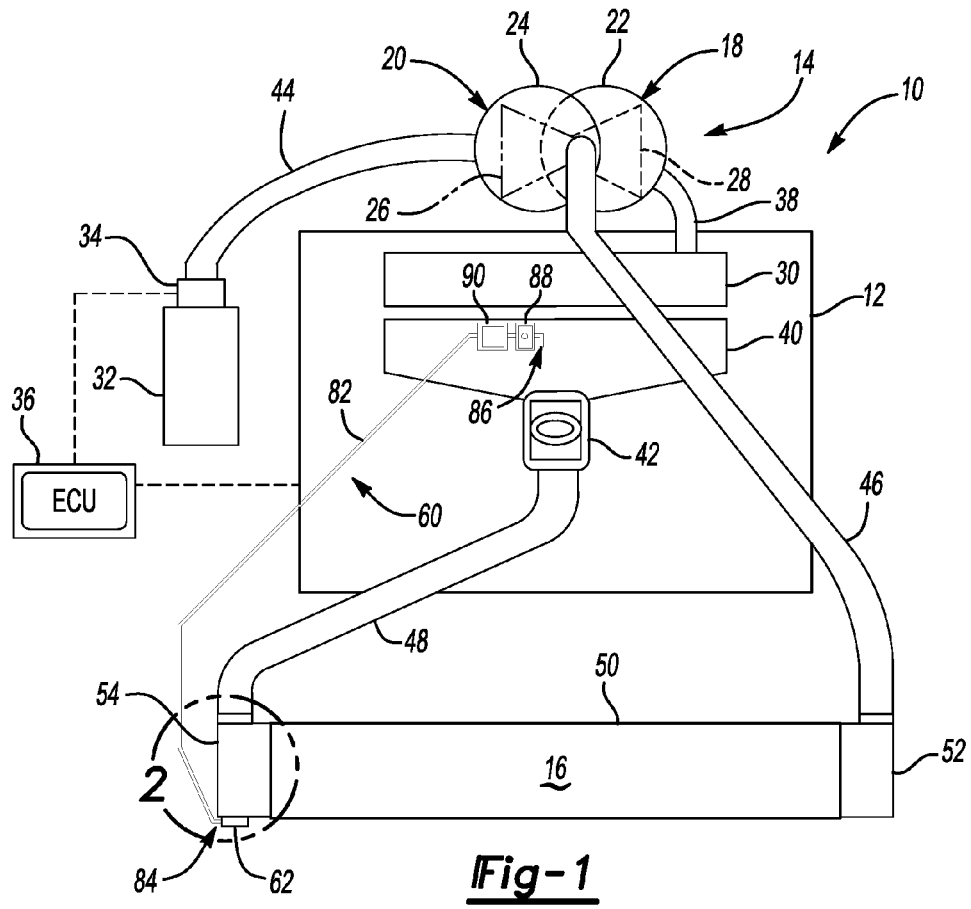
FIG. 1 is a schematic illustration of an exemplary internal combustion engine assembly equipped with a supercharging device, charge air cooler, and condensate extractor assembly in accordance with one embodiment of the present invention.

Referring to the drawings, wherein like reference numbers refer to like components throughout the several views, FIG. 1 is a schematic illustration of a representative internal combustion engine (ICE) assembly, identified generally as 10, with which the present invention may be incorporated and practiced. It should be readily understood that FIG. 1 is merely an exemplary application by which the present invention may be utilized. As such, the present invention is by no means limited to the particular engine configuration of FIG. 1. In addition, although the ICE assembly 10 is intended for use in an automobile, such as, but not limited to, standard passenger cars, sport utility vehicles, light trucks, heavy duty vehicles, minivans, and the like, it may be incorporated into any motorized vehicle application, including, but certainly not limited to, buses, tractors, boats and personal watercraft, airplanes, etc. Finally, the drawings presented herein are not to scale, and are provided purely for instructional purposes. As such, the specific and relative dimensions shown in the drawings are not to be considered limiting.

The ICE assembly 10 includes an engine block (also referred to in the art as "cylinder case") and a cylinder head, which are represented collectively at 12. The ICE assembly 10 is equipped with a supercharging device, represented herein by a turbocharger device 14, and a charge air cooler (CAC) 16. Notably, the engine block and cylinder head 12, turbocharger device 14, and CAC 16 shown in FIG. 1 hereof have been greatly simplified, it being understood that further information regarding the function and operation of such systems may be found in the prior art. In addition, those skilled in the art will recognize that the engine block and cylinder head 12 may be integrally formed (as depicted in FIG. 1), or be pre-fabricated as individual, separate components that are subsequently connected to one another, e.g., by bolting, welding, or other attachment means. Finally, the ICE assembly 10 may operate in a compression-ignited or spark-ignited combustion mode within the scope of the invention claimed herein.

With continued reference to FIG. 1, the ICE assembly 10 includes an exhaust manifold 30 (also referred to in the art as "exhaust header") that is fluidly coupled to the engine block and cylinder head 12, and configured to receive and expel exhaust gases therefrom. For example, the cylinder case portion of the engine block and cylinder head 12 defines a plurality of exhaust ports (not shown) through which exhaust gases or products of combustion are selectively evacuated from a plurality of variable-volume combustion chambers (not shown) fluidly coupled therewith. The exhaust ports communicate the exhaust gases to the exhaust manifold 30, which may be defined within the cylinder head portion of the engine block and cylinder head 12. The exhaust manifold 30 delivers a portion of the exhaust gas to the turbocharger device 14, and a portion to an exhaust aftertreatment system (not illustrated herein) for reducing the toxicity of the exhaust gas emissions before subsequent release to the atmosphere.

The ICE assembly 10 also includes an air intake system, which is represented herein by an intake manifold 40 (or inlet manifold) in downstream fluid communication with a throttle body 42. The throttle body 42 is operable to regulate the amount of air flowing into the engine, normally in response to driver input. The intake manifold 40, on the other hand, is responsible for evenly distributing the fuel/air mixture to the intake port(s) (not shown) of the various variable volume combustion chambers.

Operation of the ICE assembly 10 creates a pressure gradient when the engine is in an on-state. For example, the downward movement of the reciprocating pistons (not shown) inside each variable volume combustion chamber, along with the fluid restriction caused by the throttle valve (not shown) inside the throttle body 42 (referred to as "choked flow") creates a vacuum inside the intake manifold 40.

The turbocharger device 14 is in fluid communication with the air intake system of the ICE assembly 10, operable to compress the incoming air charge before it enters the intake manifold 40. More specifically, the turbocharger device 14 includes a turbine portion 18 and a compressor portion 20. The turbine portion 18 has a turbine housing 22, which is fluidly coupled to the exhaust manifold 30 via exhaust line 38. The turbine housing 22 redirects a portion of the flowing exhaust stream from the exhaust manifold 30 to spin a turbine blade or impeller, shown hidden in FIG. 1 at 28, rotatably mounted therein. The compressor portion 20, on the other hand, has a compressor housing 24 with a compressor blade, shown schematically in phantom at 26 in FIG. 1, rotatably mounted therein. Inlet air for the compressor housing 24 is drawn from the ambient atmosphere through a clean air filter 32 via clean air duct 44.

The turbine blade 28 is rigidly coupled to the compressor blade 26 (e.g., linked by a shared axle) for unitary rotation therewith, as seen in FIG. 1. During normal operation of the ICE assembly 10, the turbine housing 22 receives exhaust gases from the exhaust manifold 30, forcing the impeller 28 and, thus, the compressor blade 26 to rotate. As the compressor blade 26 spins, ambient air received from air filter 32 is compressed within the compressor housing 24. Air compressed by the compressor portion 20 is communicated by compressor output duct (or CAC inlet duct) 46 to the CAC system 16, the compressor housing 24 being in upstream fluid communication with the CAC 16. It should be recognized that the present invention may incorporate a single turbocharger, twin turbochargers, staged turbochargers, or various other engine supercharging devices without departing from the intended scope of the present invention.

Still referring to FIG. 1 of the drawings, a mass airflow (MAF) sensor 34 is positioned between the clean air filter 32 and clean air duct 44. The MAF sensor 34 is used to determine the mass of air entering the ICE assembly 10—i.e., through the compressor portion 20 of turbocharger device 14, and communicate this information to an engine control unit (ECU) 36. The air mass information is necessary for the ECU 36 to calculate and deliver the correct fuel mass to the intake manifold 40.

The charge air output is routed from the compressor portion 20 of the turbocharger device 14 through the CAC 16 before entering the intake manifold 40. To this regard, the CAC system 16 is fluidly coupled to the ICE air intake system, positioned in downstream fluid communication with the turbocharger device 14, and in upstream fluid communication with the air intake manifold 40 and throttle body 42. The CAC system 16 is configured to extract heat from compressed airflow exiting the turbocharger device 14—i.e., cool the air charge, prior to the compressed airflow entering the ICE air intake system. Although condensate buildup is a phenomena normally associated with air-to-air charge air coolers, the CAC system 16 may also be of the air-to-liquid type heat exchanger.

The CAC system 16 includes a heat exchange core assembly 50 with a first end tank 52 (also referred to herein as the "hot end tank" or "upstream end tank") operatively attached thereto. The upstream end tank 52 provides a transition to allow the intake air from the turbocharger device 14 to flow from the compressor output duct 46 into the inner cooling tubes (not shown) of the CAC 16. The upstream end tank 52 is in upstream fluid communication with a second end tank 54 (also referred to herein as the "cold end tank" or "downstream end tank") operatively attached to an opposite end of the heat exchange core assembly 50. The downstream end tank 54 provides a transition to allow the intake air to flow from the tubes of the CAC system 16 to an induction duct 48, for subsequent transfer to the throttle body 42.

Figure 2:
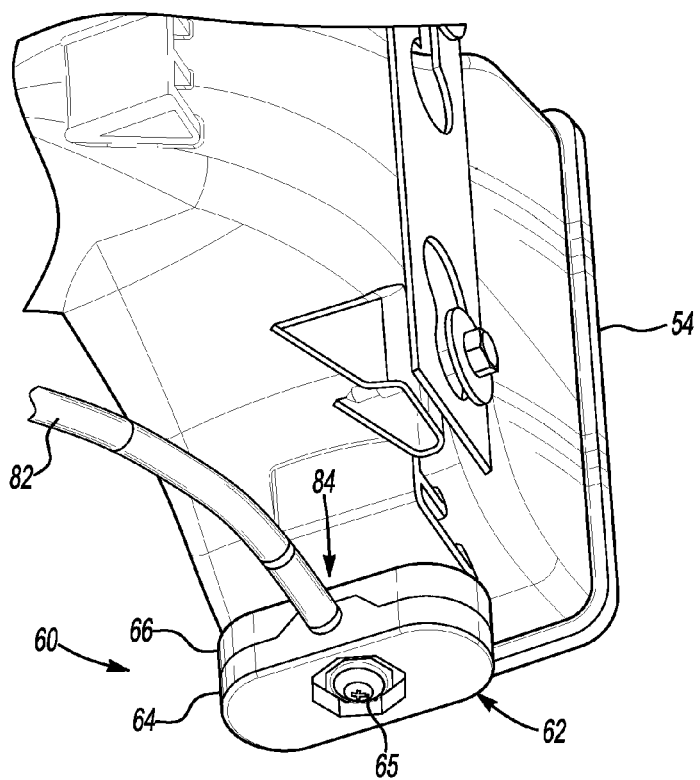
FIG. 2 is an enlarged perspective-view illustration of a portion of the charge air cooler and condensate extractor assembly of FIG. 1.

In accordance with the present invention, the ICE assembly 10 employs a condensate extractor assembly, generally designated at 60 in FIG. 1, to controllably collect, drain, and evacuate water condensation from the CAC system 16, preventing premature engine wear and prolonging the operational life expectancy of the CAC 16. The condensate extractor assembly 60 includes a sump member (or "low port attachment") 62 that is configured to integrate with (i.e., form in or attach to) the CAC 16. By way of example, and not limitation, the sump member 62 is shown in FIG. 2 fluidly coupled directly to the bottom of the cold end tank 54. The sump member 62, as will be described in extensive detail hereinbelow, is adapted to drain and collect condensate from the charge air cooler 16.

The condensate extractor assembly 60 also includes a hose member 82—e.g., a 0.25 inch diameter rubber hose, having first and second ends 84 and 86, respectively. The first end 84 of hose member 82 is fluidly coupled directly to the sump member 62, whereas the second end 86 is preferably fluidly coupled directly to the intake manifold 40. The hose member 82, thus, fluidly couples the sump member 62 to the ICE intake manifold 40. By packaging the hose member 82 in this manner, air mass is not added to or subtracted from the intake manifold 40 that has not been measured by the MAF sensor 34, which is important for the ECU 36 to calculate the correct amount of fuel to inject. This is also necessary in order to regulate engine emissions, and have the ICE assembly 10 run smoothly.

The hose member 82 includes at least one orifice 88—e.g., 0.10 inch diameter orifice, configured to restrict the flow of air and condensate through the hose member 82. Inclusion of the orifice 88 helps prevent undesirable amounts of water condensation and air from bypassing the throttle body 42 through the hose member 82, and entering the intake manifold 40, thus maintaining good engine speed control. To be more precise, when the ICE assembly 10 is in operation, the hose member 82 introduces a first volume of air to the air intake system, whereas the turbocharger device 14, through the CAC 16, introduces a second volume of air to the ICE air intake system. The first volume of air introduced by the condensate extractor assembly 60 is substantially smaller than the second volume (i.e., negligible in comparison) such that control of the engine mass air flow is left unaffected.

A filter 90 may be placed in direct fluid communication with the hose member 82, in upstream fluid communication with the orifice 88. The filter 90 helps prevent plugging of the hose member 82 and orifice 88 by minimizing or eliminating the buildup of debris, as well as prevent the inadvertent introduction of contaminates to the air intake system. Ideally, the orifice 88 is built into the filter 90, both of which are directly fluidly coupled to the intake manifold 40 by being t-linked into a complementary charge air bypass valve (not shown).

As noted above, the ICE assembly 10 creates a pressure gradient when in an on-state. "Engine misfire" is a phenomena that may occur when a threshold volume of water condensation builds up inside of a CAC, which is then ingested by the intake manifold in undesirable quantities due to the higher "suction" pressure created by the intake manifold. The present invention systematically mitigates the condensate buildup, feeding it in negligible quantities to the intake manifold 40, so that it never reaches the threshold point. More specifically, the hose member 82 removes condensate from the CAC 16 in a continuous and controlled manner and distributes it directly to the intake manifold 40 in response to the ICE generated pressure gradient, spreading out water ingestion by the intake manifold 40, thereby preventing engine misfire. Recognizably, the accumulation of condensate predominantly occurs under low throttle input. The present invention is ideal as it extracts condensate the moment it accumulates in the CAC 16. Moreover, the condensate extractor assembly 60 continues to pull condensate even if the engine is running at idle, as the suction rate through the condensate extraction assembly 60 is greater than that from the throttle body 42.

Ideally, the hose member 82 is configured to maintain, for example, but not limited to, 2.5 ounces (oz) or less of condensate in the CAC system. The length and internal diameter of the hose member 82, as well as the size of the orifice 88, can be selectively modified to provide varying levels of condensate extraction—i.e., varying suction rates. For example, a condensate extractor assembly 60 according to the present design employing a 3 foot long hose member 72 having a 0.25 inch internal diameter, in conjunction with a filter 90 having a 0.10 inch orifice 88 can achieve an extraction rate of 4.0 ounces/minute. This extraction rate is approximately 15 times greater than the expected accumulation rate. Notably, hose clamps (not shown) may be used to eliminate any unwanted leaks, and to ensure optimal extraction rate.

According to preferred practice, the condensate extraction assembly 60, namely sump member 62, is placed in direct fluid communication with the vertically lowest most portion of the CAC system 16. The vertically lowest actual point of the CAC 16, for example, is downstream from the heat exchange core 50 (e.g., the cold end tank 54) where water condensation tends to naturally build up through gravity and airflow. By placing the sump member 62 in direct fluid communication with the vertically lowest point of the CAC downstream end tank 54 to drain condensate therefrom, pooling or puddling of water condensation within the charge air cooler 16 is minimized or eliminated. In a similar regard, the hose member 82 is oriented such that the first end 84 is the vertically lowest most portion thereof. By packaging the hose member 82 in this manner, pooling or puddling of water condensation within the condensate extractor system 60 is also minimized or eliminated.

Many prior art condensate extractors employ a fluid container, such as a reservoir or tank that is fluidly coupled to the CAC, to collect and store water condensation. However, accumulated condensate that is not properly evacuated from a charge air cooler can freeze when ambient temperatures reach below freezing, which may cause the charge air cooler to break down. In addition, reservoirs have a tendency to buildup excessive water which noticeably "sloshes" during vehicle turns and acceleration. In addition, most reservoirs are functionally dependent upon gravity, and are thus operatively sensitive to variations in lateral road orientation—known as "road camber effect." The condensate extractor system 60 in accordance with the present invention, namely hose member 82, is characterized by a lack of fluid communication with a reservoir or tank configured to collect water condensation. By eliminating use of a reservoir or tank, slosh and road camber phenomena associated with the use of such containers is eliminated. In a similar regard, the hose member 82 is characterized by a lack of a direct fluid communication with the throttle body to further militate against unwanted interruption of engine control by ECU 36.

Figure 3A:
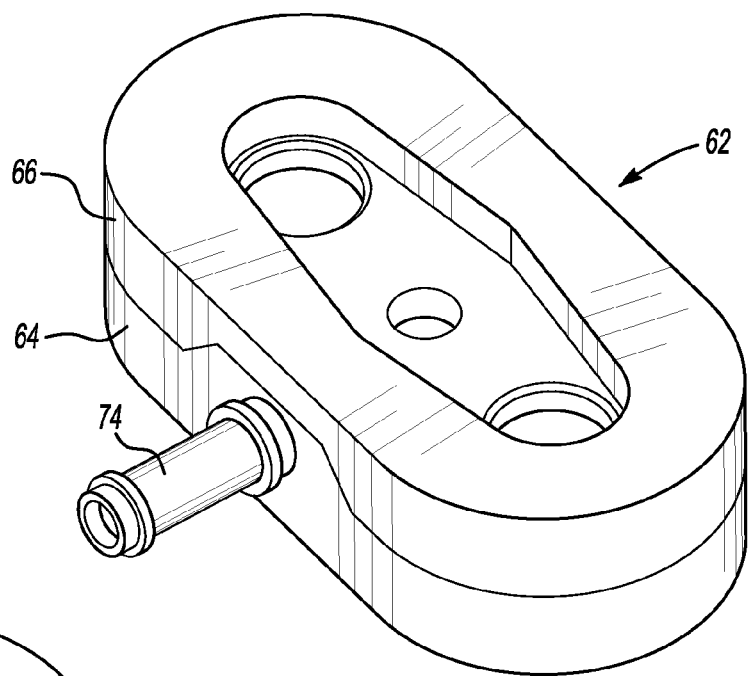
FIGS. 3A-3C are various enlarged perspective-view illustrations of the sump member portion of the condensate extractor assembly of FIGS. 1 and 2.
Figure 3B:
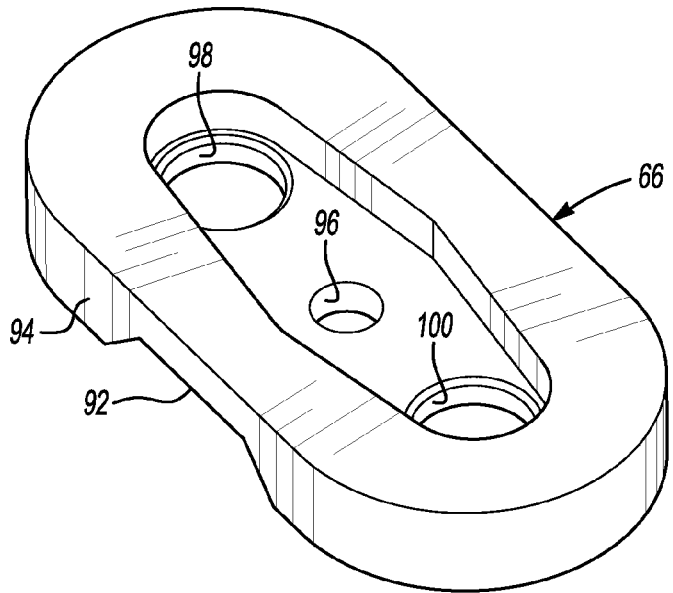
Figure 3C:
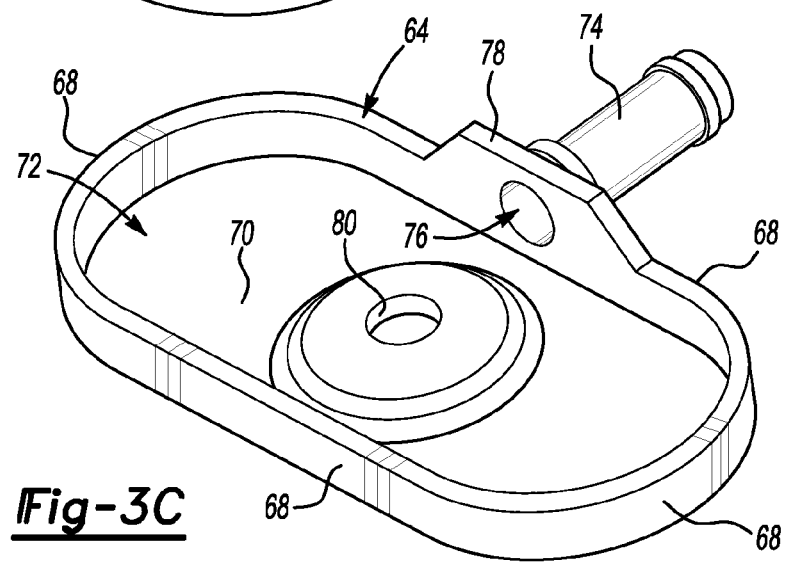

Turning now to FIGS. 3A-3C, the sump member 62 of FIGS. 1 and 2 includes a sump base 64. As best seen in FIG. 3C, the sump base 64 includes a plurality of side walls 68 that cooperate with a base wall 70 to define a sump volume, indicated generally at 72, for accumulating condensate therein. The size and shape of the sump volume 72 can be tuned to meet the needs of a particular application. A line extension (or "evac port") 74 protrudes from the sump base 64. The line extension 74 defines a longitudinally elongated channel 76 therethrough. The line extension 74 is intended to be press-fit into the first end 84 of the hose member 82, fluidly coupling the sump volume 72 to the hose member 82. As seen in FIGS. 1 and 2, when the sump member 62 and CAC 16 are operatively attached to the ICE assembly 10, the sump volume 72 is vertically lower than the CAC 16, allowing for gravitational drainage of condensate from the CAC 16.

In the embodiment of FIGS. 3A-3C, the sump member 62 also includes a sump cap 66 that is operatively attached to the sump base 64. For instance, the sump cap 64 is shown as geometrically coterminous to the sump base 64. The sump base 64 also includes a ridge portion 78 which is dimensioned and shaped to mate with a complementary indentation or notch 92 formed into a sidewall 94 of the sump cap 66. In addition, the sump base and cap 64, 66 each defines a complementary fastener hole 80 and 96, respectively, therethrough. When the sump cap 66 is placed on top of the sump base 64, with the ridge portion 78 nested within and abutting against the indentation 92, as seen in FIG. 3A, the fastener holes 80 and 96 are aligned, creating a channel for receiving and mating with a fastener, such as a bolt 65 of FIG. 2. When the bolt 65 is fed through fastener holes 80 and 96 and threadably coupled to a threaded hole (not visible in the drawings) in the CAC 16, the sump base 64 is operatively attached to the sump cap 66, and the sump member 62 is operatively attached to the CAC 16, namely cold end cap 54.

Looking at FIG. 3B, the sump cap 66 also defines one or more fluid apertures therethrough—i.e., first and second fluid apertures 98 and 100, respectively. When the sump member 62 is attached to the CAC 16, as described above, each fluid aperture 98, 100 is aligned with a complimentary hole formed through the cold end cap 54, thereby fluidly communicating the sump volume 72 with the CAC 16. Although shown in FIGS. 3A-3C as separate constituent parts, the sump base 64 and sump cap 66 may be pre-formed as a single-piece, unitary structure. In addition, the shape and size of the sump base 64 and sump cap 66 may be individually or collectively modified without departing from the intended scope of the present invention.

Figure 4A:
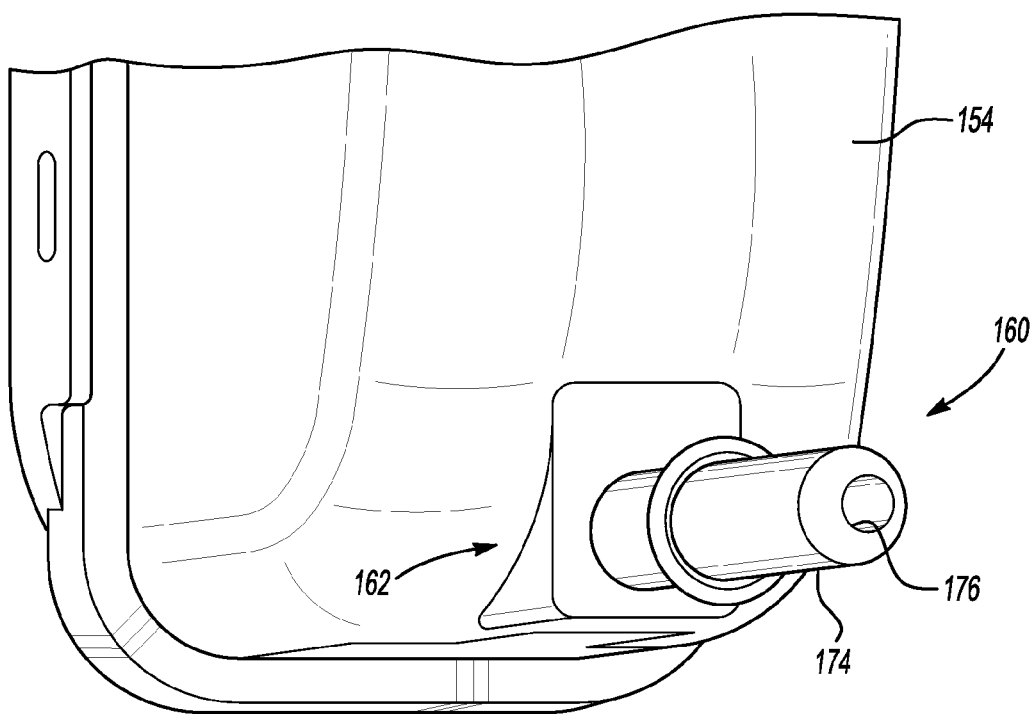
FIGS. 4A-4B are various enlarged perspective-view illustrations of the sump member portion of a condensate extractor assembly in accordance with another embodiment of the present invention.
Figure 4B:
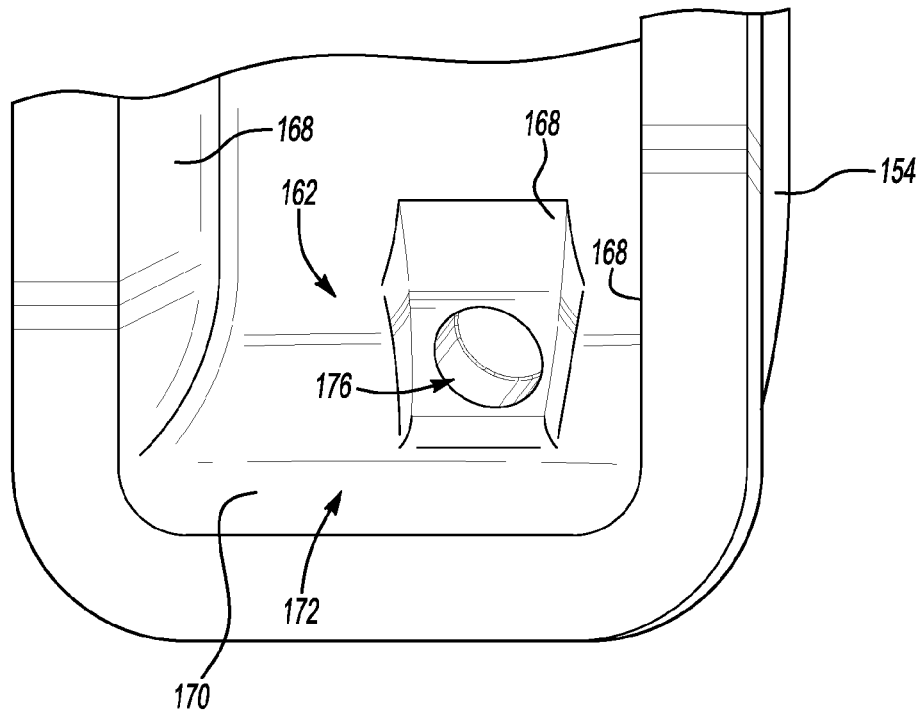

FIGS. 4A and 4B provide two perspective-view illustrations of a sump member 162 of a condensate extractor assembly 160 in accordance with another embodiment of the present invention. Synonymous to the sump member 62 described above, the sump member 162 of FIGS. 4A-4B is adapted to collect and drain condensate from the CAC 16 of FIG. 1. In contrast to the embodiment of FIGS. 3A-3C, the sump member 162 of the condensate extractor assembly 160 of FIGS. 4A-4B is formed into the cold end cap 154. In this instance, the sump member 162 creates the vertically lowest point inside of the CAC 16. That is, the sump member 162 includes a plurality of side walls 168 that cooperate with a base wall 170 to define a sump volume, indicated generally at 172 in FIG. 4B, for accumulating condensate therein. The sump volume 172 is vertically offset below the heat exchange core assembly 50 of the CAC 16.

A line extension (or "evac port") 174 protrudes from the sump member 162. Similar to the line extension 74 of FIGS. 3A-3C, the evac port 174 of FIGS. 4A-4B defines a longitudinally elongated channel 176 therethrough. The line extension 174 is intended to be press-fit into the first end 84 of the hose member 82 (FIG. 1), fluidly coupling the sump volume 172 of FIG. 4B to the hose member 82.

While the best modes for carrying out the present invention have been described in detail, those familiar with the art to which this invention relates will recognize various alternative designs and embodiments for practicing the invention within the scope of the appended claims.

The invention claimed is:

1. A condensate extractor assembly for collecting and evacuating condensate from a charge air cooler in an internal combustion engine assembly, the internal combustion engine assembly including an air intake system in fluid communication with the charge air cooler, the air intake system including an intake manifold in fluid communication with a throttle body, the condensate extractor assembly comprising:
   a sump member configured to integrate with the charge air cooler and adapted to collect condensate from the charge air cooler; and
   a hose member having a first end in fluid communication with the sump member and a second end configured to fluidly communicate with the intake manifold, wherein the hose member is configured to evacuate condensate from the sump member and distribute it to the intake manifold; and
   wherein the sump member includes a sump base defining a sump volume configured to accumulate condensate therein, a line extension protruding from the sump base and configured to fluidly couple the sump volume to the first end of the hose member, and a sump cap operatively attached to the sump base, the sump cap defining at least one fluid aperture therethrough, and wherein the at least one fluid aperture is configured to fluidly communicate the sump volume with the charge air cooler.

2. The condensate extractor assembly of claim 1, wherein the hose member defines an orifice configured to restrict the flow of air and condensate through the hose member.

3. The condensate extractor assembly of claim 2, further comprising:
   a filter member in fluid communication with the hose member fluidly upstream from the orifice.

4. The condensate extractor assembly of claim 1, wherein the sump volume is vertically lower than the charge air cooler when the sump member and charge air cooler are operatively attached to the internal combustion engine assembly.

5. The condensate extractor assembly of claim 1, wherein the sump cap further defines a fastener hole therethrough, wherein the fastener hole is configured to receive and mate with a fastener to thereby attach the sump member to the charge air cooler.

6. The condensate extractor assembly of claim 1, wherein the charge air cooler includes a first end tank in upstream fluid communication with a second end tank, and wherein the sump member is adapted to fluidly couple to the bottom of the second end tank.

7. The condensate extractor assembly of claim 1, wherein the charge air cooler includes a first end tank in upstream fluid communication with a second end tank, and wherein the sump member and second end tank are a single-piece structure.

8. The condensate extractor assembly of claim 1, wherein the engine assembly creates a pressure gradient when in an on-state, and wherein the hose member continuously evacuates condensate from the sump member in response to the pressure gradient.

9. The condensate extractor assembly of claim 1, wherein the hose member is characterized by a lack of fluid communication with a container configured to collect and store condensate therein.

10. The condensate extractor assembly of claim 1, wherein the hose member is characterized by a lack of a direct fluid communication with the throttle body.

11. An internal combustion engine assembly that creates a pressure gradient when in an on-state, the engine assembly comprising:
    an air intake system including an intake manifold in downstream fluid communication with a throttle body;
    a charge air cooler in fluid communication with the air intake system and in upstream communication with the throttle body;
    a sump member in direct fluid communication with the charge air cooler and configured to drain and collect condensate from the charge air cooler; and
    a hose member having a first end fluidly coupled to the sump member and a second end fluidly coupled to the intake manifold, the hose member having a hose diameter, and including an orifice configured to restrict the flow of air and condensate through the hose member, the orifice having an orifice diameter; and
    wherein the hose member continuously evacuates condensate from the sump member and distributes it directly to the intake manifold in response to the engine pressure gradient; and
    wherein the orifice diameter is smaller than the hose diameter.

12. The engine assembly of claim 11, further comprising:
    a filter member fluidly coupled to the hose member between the orifice and the sump member.

13. The engine assembly of claim 11, wherein the charge air cooler is operatively attached to the engine assembly, and wherein the sump member is fluidly coupled to a vertically lowest most portion of the charge air cooler.

14. The engine assembly of claim 11, wherein the sump member includes a sump base defining a sump volume configured to accumulate condensate therein, a line extension protruding from the sump base and fluidly coupling the sump volume to the first end of the hose member, and a sump cap operatively attached to the sump base, the sump cap defining at least one fluid aperture therethrough, and wherein the at least one fluid aperture is configured to fluidly communicate the sump volume with the charge air cooler.

15. The engine assembly of claim 14, wherein the sump volume is vertically lower than the charge air cooler relative to the engine assembly.

16. The engine assembly of claim 11, wherein the charge air cooler includes a hot end tank in upstream fluid communication with a cold end tank, and wherein the sump member is either fluidly coupled directly to the bottom of the cold end tank or the sump member and cold end tank are a unitary single-piece structure.

17. An internal combustion engine assembly having an engine block, the internal combustion engine assembly creating a pressure gradient when in an on-state, the engine assembly comprising:
- an air intake system in fluid communication with the engine block and operable to regulate the distribution of air charges thereto, the air intake system including an intake manifold in downstream fluid communication with a throttle body;
- an exhaust manifold in fluid communication with the engine block and operable to receive and expel exhaust gases therefrom;
- a turbocharger device in downstream fluid communication with the exhaust manifold and configured to redirect exhaust flow therefrom to thereby compress air, wherein the turbocharger device is in upstream fluid communication with the air intake system and configured to distribute compressed airflow thereto;
- a charge air cooler in downstream fluid communication with the turbocharger device and in upstream fluid communication with the air intake system, wherein the charge air cooler is configured to extract heat from compressed airflow exiting the turbocharger device prior to entering the air intake system;
- a sump member fluidly coupled directly to the charge air cooler and configured to drain and collect condensate from inside the charge air cooler;
- a hose member having a first end fluidly coupled to the sump member and a second end fluidly coupled to the intake manifold, wherein the hose member continuously evacuates condensate from the sump member and distributes it directly to the intake manifold in response to the engine pressure gradient, wherein the hose member defines an orifice configured to restrict the flow of air and condensate through the hose member; and
- a filter member fluidly coupled to the hose member between the orifice and the sump member; and
- wherein the sump member includes a sump base defining a sump volume configured to accumulate condensate therein, a line extension protruding from the sump base and configured to fluidly couple the sump volume to the first end of the hose member, and a sump cap operatively attached to the sump base, the sump cap defining at least one fluid aperture therethrough, and wherein the at least one fluid aperture is configured to fluidly communicate the sump volume with the charge air cooler.

18. The engine assembly of claim 11, wherein the hose diameter is greater than twice the orifice diameter.

* * * * *